(12) United States Patent
Harth et al.

(10) Patent No.: US 6,211,113 B1
(45) Date of Patent: *Apr. 3, 2001

(54) CATALYST BEDS FOR NON-STEADY STATE PROCESSES

(75) Inventors: Klaus Harth, Altleiningen; Alfred Hagemeyer; Otto Watzenberger, both of Ludwigshafen, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/711,553

(22) Filed: Sep. 10, 1996

(30) Foreign Application Priority Data

Sep. 12, 1995 (DE) ................................. 195 33 661

(51) Int. Cl.⁷ ............................. B01J 27/24; B01J 21/08; B32B 15/02; B32B 17/02
(52) U.S. Cl. ........................ 502/200; 502/224; 502/232; 502/243; 502/258; 502/439; 502/527.11; 502/527.12; 502/527.13; 502/527.14; 502/527.15; 428/403; 428/404; 428/570
(58) Field of Search ................. 502/200, 202–207, 502/224–232, 241–249, 258–263, 300, 305–339, 344–355, 439, 527; 428/403, 404, 570; 427/569–579

(56) References Cited

U.S. PATENT DOCUMENTS

| | | | |
|---|---|---|---|
| 4,430,443 | * | 2/1984 | Seiver et al. ................ 502/200 |
| 4,500,650 | * | 2/1985 | Wyatt et al. ................ 502/204 |
| 4,536,482 | * | 8/1985 | Carcia ...................... 502/200 |
| 4,698,324 | * | 10/1987 | Haruta et al. ............... 502/345 |
| 4,703,028 | | 10/1987 | Steininger .................. 502/178 |
| 4,719,145 | * | 1/1988 | Neely ........................ 502/349 |
| 4,810,688 | * | 3/1989 | Ewert et al. ................. 502/345 |
| 4,861,746 | * | 8/1989 | Oishi et al. ................. 502/204 |
| 5,229,345 | * | 7/1993 | Logothetis et al. ........... 502/349 |
| 5,334,570 | * | 8/1994 | Beauseigneur et al. ......... 502/349 |
| 5,431,012 | * | 7/1995 | Narula et al. ................ 60/276 |
| 5,446,003 | * | 8/1995 | Augustine et al. ............ 502/349 |
| 5,480,622 | * | 1/1996 | Narula et al. ............... 422/174 |
| 5,559,065 | * | 9/1996 | Lauth et al. ................. 502/5 |

FOREIGN PATENT DOCUMENTS

| | | | |
|---|---|---|---|
| 4413734 | 11/1994 | (DE) | B01J/35/04 |
| 283198 | 9/1988 | (EP) | C01B/7/04 |
| 576944 | 1/1994 | (EP) | B01J/37/02 |
| WO85/02557 | 6/1985 | (WO) | B01J/37/02 |

* cited by examiner

*Primary Examiner*—Mark L. Bell
*Assistant Examiner*—Patricia L. Hailey
(74) *Attorney, Agent, or Firm*—John H. Shurtleff

(57) ABSTRACT

A layered catalyst support or carrier provides a core member for carrying out non-steady state heterogeneously catalyzed processes where reaction gases and their products come in contact with a conventional catalyst applied to the carrier. The support as a carrier is made up of a large number of individually shaped particulate bodies or monolithic packings to be loaded into a reactor and maintained as a fluidized bed or a fixed bed during the non-steady state reaction and the recovery of the products. The support or carrier may consist of glass, quartz, oxides, nitrides, aluminosilicates, magnesium silicates, metals and carbon or their mixtures. Each shaped particle or monolithic packing of this core support is then completely enclosed by depositing thereon a thin protective layer of a nitride, oxide, carbide or chloride of a metal, a non-metal or a mixture thereof, which exhibits a dense, pore-free microstructure and a nonpolar surface having a very low density of acid centers. This outer layer is applied to the core support by a plasma-assisted gas phase deposition. The catalytically active layer is then applied to this protective layer.

4 Claims, No Drawings

CATALYST BEDS FOR NON-STEADY STATE PROCESSES

The present invention relates to coated catalysts for non-steady state, heterogeneously catalyzed processes which are composed of a support, an intermediate layer and generally at least one active layer.

Non-steady state process procedures have been described for a series of reactions, for example for the oxidation of alkanes to give aldehydes, carboxylic acids or carboxylic anhydrides, for the oxidative dehydrogenation of alkanes or alkylaromatics or for the oxidative coupling of methane. In these reactions, the catalyst functions as an oxygen reservoir which is reduced during the actual oxidation reaction and is oxidized in a separate step. Non-steady state processes are also known for the preparation of $Cl_2$ from HCl (Deacon process) in which the catalyst is chlorinated in a first step with liberation of water ("loading") and then is oxidized in a second step with release of $Cl_2$ ("stripping"). The individual reaction stages can be carried out separated in time (e.g. by switching the material flows in a fixed-bed reactor) or in space (e.g. by discharging the catalyst in a circulating fluidized-bed reactor or riser reactor).

EP-A-283 198 discloses a process for preparing chlorine by reaction of HCl and oxygen in the presence of a chromium oxide catalyst, where the reactor is lined with a material based on an oxide, nitride or carbide of the elements B, Al, Si, Ti, Zr or Cr. The lining prevents corrosion of the reactor and poisoning of the catalyst by wall material.

WO-A-85/02557 discloses an inert catalyst support having a porous intermediate layer, its porosity being in the micrometer range, which is applied by physical gas-phase deposition and comprises an oxide, nitride or carbide of the elements B, Si or Al. The intermediate layer serves to improve the adhesion of the active layer to the support. Owing to the described porosity of the intermediate layer, no advantages of these catalysts are to be expected for non-steady state reaction procedures.

Known, commercially available catalyst supports, for example those based on $Al_2O_3$ or $SiO_2$, have a strong interaction with starting materials or products because of their acid surface. Therefore, even in the case of micropore-free supports, undesired adsorption of the corresponding molecules on the surface of the support can take place to an increased extent. Thus, the support materials mentioned show, for example in the non-steady state Deacon process, a high HCl uptake which makes uneconomically long flushing phases between the individual cycles necessary. Shortening of this flushing time leads to a less pure product stream and necessitates more complicated work-up. Besides the uptake of the starting materials on the catalyst support, the uptake on the inner wall of the reactor or the reactor pipes can also lead to undesired contamination of the product stream.

It is an object of the present invention to develop a supported catalyst suitable for non-steady state procedures and to provide a solution to the abovementioned disadvantages, in particular with low uptake capacity for the starting materials or products.

We have found that this object is achieved by means of coated catalysts for non-steady state, heterogeneously catalyzed processes comprising a catalyst support, an intermediate layer and optionally at least one active layer, wherein between the support and optionally one or more active layers there is located an intermediate layer comprising a nitride, oxide, carbide or chloride of a metal or a nonmetal or a mixture thereof, and having a dense, pore-free microstructure and a nonpolar surface having a very low density of acid centers.

The coated catalysts of the present invention have a core (support) and a protective or intermediate layer, preferably an intermediate layer, which has a high barrier action to diffusion and a low adsorption of the starting materials or products. The intermediate layer of the present invention comprises at least one nitride, oxide, carbide or chloride of a metal such as Al, Ti, V, Cr, Mn, Fe, Co, Ni, Cu, Zn, Y, Zr, Nb, Mo, Ru, Rn, Pd, Ag, Cd, In, Sn, Sb, Tc, Hf, Ta, W, Re, Os, Ir, Pt, Au, Pb, Bi, preferably Al, Ti, Cr, Zr, Ag, Ta, or a nonmetal such as boron, silicon, germanium, preferably silicon.

The more precise selection of the intermediate layer is determined by the boundary conditions of the respective non-steady state process. Examples of processes which can be carried out in a non-steady state manner are the Deacon process and oxidation reactions. The non-steady state processes can be carried out at from 50 to 600° C., preferably from 100 to 550° C., particularly preferably from 150 to 520° C., and at a pressure of from 0.1 to 100 bar, preferably from 0.5 to 80 bar, particularly preferably from 1 to 70 bar.

In the non-steady state Deacon process, suitable intermediate layers are those comprising nitrides, highly calcined oxides (e.g. $SiO_2$), silver chloride or mixtures thereof, preferably $Si_3N_4$, silver chloride or mixtures thereof, particularly preferably $Si_3N_4$.

The thickness of the intermediate layer is generally from 1 to 10,000 nm, preferably from 5 to 100 nm. The minimum thickness depends on the desirability of the support being covered completely and without pores by the intermediate layer.

The intermediate layers of the present invention can be prepared by PVD (Physical Vapor Deposition) or CVD (Chemical Vapor Deposition). Possible PVD processes are evaporation, cathode atomization or electric arc coating (cf. R. F. Bhunshah et al., "Deposition technologies for Films and Coatings", Noyes Publications, 1982). A possible CVD process is plasma-assisted gas-phase deposition (cf. H. Yasuda, "Plasma Polymerization", Academic Press, 1985). The intermediate layer can preferably be deposited by plasma-assisted production processes, since these generally lead to dense, pore-free layers having a high barrier action to diffusion.

The deposition processes can be carried out by reactive or nonreactive means in a manner known per se. In the case of reactive preparation, the metal or nonmetal is deposited in conjunction with a reactive gas (e.g. $O_2$, $N_2$, hydrocarbons, $Cl_2$), with the corresponding oxides, nitrides, carbides or chlorides being obtained directly. In the case of nonreactive deposition, the metal or nonmetal is deposited as a thin layer in a first step and is, in a separate subsequent step, oxidized, nitrided, carburized or chlorinated.

Suitable supports for the catalysts of the present invention are, for example, shaped bodies or monolithic packings comprising ceramics, metals or plastics. Possible materials are, for example, glass, fused quartz, aluminum oxide, silicon nitride, titanium dioxide, aluminosilicates, magnesium silicates, metals or carbon. Suitable shaped bodies are, inter alia, pellets, extrudates or granules, with the support being able to have a spherical, cylindrical, ring-shaped, star-shaped, wagon wheel shaped or other suitable geometry. Suitable packings are the reactor packings known per se having static mixing properties (Chemical Engineering, June 1994, pages 76–82). It is possible to use either pore-free or pore-containing supports. Preference is given to using pore-free supports or micropore-free supports having a pore size which can be set in the mesopore and macropore range. Other suitable supports are, in particular, low-cost standard catalyst supports whose adsorption behavior without coating would be unsuitable for a non-steady state production process for the abovementioned reasons, for example supports based on $Al_2O_3$ or $SiO_2$, preferably supports of glass.

The application of the catalytically active layer to the support provided with the intermediate layer can generally be carried out by known wet chemical or powder metallurgical coating processes such as impregnation, spray impregnation, high-coating, flame or plasma spray, or a PVD or CVD process.

When using the coated catalysts of the present invention in non-steady state processes it is advantageous to also coat the walls and the feed lines of the reactor with a low-adsorption layer having a barrier action to diffusion (intermediate layer material). The same boundary conditions as for support coating apply to the coating of these reactor parts.

EXAMPLES

Catalyst support A

Preparation of a support having an $Si_3N_4$ intermediate layer

Pore-free, surface roughened glass spheres having a diameter of 3 mm were laid on a circular steel mesh (diameter 100 mm, mesh opening 0.4 mm) and introduced into a cathode atomization unit. A polycrystalline Si target (diameter 150 mm) was placed at a distance of 56 mm. At a pressure of $10^{-6}$ mbar, argon was admitted until a pressure of $5 \cdot 10^{-3}$ mbar had been reached, an RF (radiofrequency) voltage having a power of 250 W was applied to the periodically vibrating steel mesh and the support was subjected to sputter etching for 5 minutes. Subsequently, nitrogen at a pressure of $3 \cdot 10^{-3}$ mbar was admitted, the argon partial pressure was set to $2 \cdot 10^{-3}$ mbar, an RF plasma having a power of 1000 W was applied and the Si target was atomized on the surface in the RF magnetron mode. This gave an $Si_3N_4$ layer having a thickness of 30 nm on the glass spheres.

Catalyst support B

Preparation of a support having an AgCl intermediate layer

Roughened glass spheres were preteated as beforementioned in a cathode atomization unit. A 100 nm thick Ag layer was deposited on the support by means of DC (direct current) magnetron sputtering of an Ag target (diameter 200 mm) using a power of 500 W at an argon pressure of $5 \cdot 10^{-2}$ mbar. The coated spheres were subsequently exposed at 400° C. for 8 minutes to an HCl-containing atmosphere.

Adsorption behavior toward HCl

The catalyst supports A and B according to the present invention is and—as comparison—also the reference support (not according to the present invention) Pural® SCF ($Al_2O_3$) from Condea and $SiO_2$ had their HCl-adsorption behavior determined in a tube reactor containing a 20 ml fixed bed of catalyst. The support was first loaded in a dry HCl stream [25% by volume in $N_2$, 400° C., space velocity (1 educt per h and per 1 catalyst) 1000 $h^{-1}$]. The adsorbed HCl was then removed using a flushing gas ($N_2$, 60l/h). The HCl content of the flushing gas was determined as a function of time by IR spectrometry. The results are summarized in the following Table.

TABLE

| Flushing time [min] | Catalyst A | Catalyst B | Empty tube | Pural ® SCF | $SiO_2$ |
| --- | --- | --- | --- | --- | --- |
| 2.3 | 0.972 | 1.47 | 1.29 | 1.92 | 1.52 |
| 4.7 | 0.026 | 0.035 | 0.032 | 0.21 | 0.082 |
| 7 | 0.0149 | 0.0195 | 0.0171 | 0.179 | 0.037 |
| 9.3 | 0.0105 | 0.0125 | 0.012 | 0.132 | 0.026 |
| 11.7 | 0.0087 | 0.0088 | 0.0091 | 0.103 | 0.0197 |
| 14 | 0.0074 | 0.0069 | 0.0073 | 0.0823 | 0.0144 |
| 16.3 | 0.0063 | 0.0054 | 0.0061 | 0.073 | 0.0122 |
| 18.7 | 0.0058 | 0.0044 | 0.0058 | 0.0642 | 0.0106 |
| 21 | 0.0049 | | 0.0049 | 0.0577 | 0.0091 |
| 23.3 | 0.0043 | | 0.0040 | 0.0533 | 0.0082 |
| 25.7 | 0.0038 | | | | 0.0076 |
| 28 | | | | 0.0318 | 0.0074 |
| 30.3 | | | | 0.0338 | 0.0066 |
| 32.7 | | | | 0.033 | 0.0055 |
| 35 | | | | 0.0315 | 0.0053 |
| 37.3 | | | | | 0.0049 |
| 39.7 | | | | | 0.0048 |
| 42 | | | | | 0.0055 |
| 49 | | | | 0.024 | 0.0049 |
| 56 | | | | | 0.0045 |

The supports according to the present invention showed a distinctly lower HCl adsorption than the comparison examples and achieve the results of the empty tube. Owing to the significantly shortened flushing phase, distinctly higher space-time yields can be achieved with the catalyst supports of the present invention than with the supports compared therewith.

We claim:

1. A supported active catalyst for carrying out a non-steady state heterogeneously catalyzed process in one or more reactors and consisting essentially of a) a catalyst core support consisting of glass initially formed as individually shaped particulate bodies or monolithic packings which are loaded into the interior of said one or more reactors, b) an intermediate layer applied to said core support as a coating to completely cover each of said particulate bodies or monolithic packings with a protective pore-free layer having a thickness of from 1 to 10,000 nm, and c) an active catalyst layer consisting of a non-steady state catalyst applied over said intermediate layer, wherein said intermediate layer consists of a nitride, oxide, carbide or chloride of a metal, a non-metal or a mixture thereof, and is applied to completely cover each of said individual support members by a plasma-assisted gas phase deposition in order to exhibit a dense, pore-free microstructure and a nonpolar surface having a very low density of acid centers.

2. A supported active catalyst as claimed in claim 1, wherein said protective intermediate layer is silver chloride.

3. A layered catalyst support as claimed in claim 1, wherein said protective layer b) has a thickness of from 5 to 100 nm.

4. A supported active catalyst for carrying out a non-steady state heterogeneously catalyzed process in one or more reactors and consisting essentially of d) a catalyst core support initially formed as individually shaped particulate bodies or monolithic packings selected from the group consisting of glass, fused quartz, aluminum oxide, silicon nitride, titanium dioxide, aluminosilicates, magnesium silicates, metals and carbon, e) an intermediate layer applied to said core support as a coating to completely cover each of said particulate bodies or monolithic packings with a protective pore-free layer having a thickness of from 1 to 10,000 nm, and f) an active catalyst layer consisting of a non-steady state catalyst applied over said intermediate layer, wherein said intermediate layer consists of silver chloride and is applied to completely cover said support layer by a plasma-assisted gas phase deposition in order to exhibit a dense, pore-free microstructure and a nonpolar surface having a very low density of acid centers.

* * * * *